United States Patent
Sun et al.

(10) Patent No.: US 12,282,480 B2
(45) Date of Patent: Apr. 22, 2025

(54) QUERY PERFORMANCE DISCOVERY AND IMPROVEMENT

(71) Applicant: INTERNATIONAL BUSINESS MACHINES CORPORATION, Armonk, NY (US)

(72) Inventors: Sheng Yan Sun, Beijing (CN); Peng Hui Jiang, Beijing (CN); Xiao Ming Ma, Xi'an (CN); Xue Ying Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/242,704

(22) Filed: Sep. 6, 2023

(65) Prior Publication Data

US 2025/0077515 A1    Mar. 6, 2025

(51) Int. Cl.
  *G06F 16/2453*    (2019.01)
  *G06N 5/022*    (2023.01)
  *G06N 20/00*    (2019.01)

(52) U.S. Cl.
  CPC ....... *G06F 16/24542* (2019.01); *G06N 5/022* (2013.01); *G06N 20/00* (2019.01)

(58) Field of Classification Search
  CPC ... G06F 16/24542; G06N 5/022; G06N 20/00
  See application file for complete search history.

(56) References Cited

U.S. PATENT DOCUMENTS

| | | | | |
|---|---|---|---|---|
| 7,747,606 B2 * | 6/2010 | Dageville | ......... | G06F 16/24549 707/759 |
| 9,870,394 B2 * | 1/2018 | Oh | ..................... | G06F 16/24542 |
| 11,526,512 B1 * | 12/2022 | Halabi | .................. | G06F 40/289 |
| 2006/0294079 A1 * | 12/2006 | Dettinger | .............. | G06F 16/284 |
| 2009/0043910 A1 * | 2/2009 | Barsness | ........... | G06F 16/24532 707/999.003 |
| 2010/0325124 A1 * | 12/2010 | Wu | ....................... | G06F 16/217 707/769 |
| 2016/0140228 A1 * | 5/2016 | Cohen | ................... | G06F 16/951 707/708 |
| 2019/0026279 A1 * | 1/2019 | Roitman | ................. | G06N 20/00 |
| 2020/0356561 A1 | 11/2020 | Nawrocke et al. | | |
| 2022/0050912 A1 | 2/2022 | Li et al. | | |
| 2022/0092069 A1 | 3/2022 | Hartsing et al. | | |
| 2022/0197933 A1 * | 6/2022 | Boxwell | ............. | G06F 16/9538 |
| 2022/0309063 A1 | 9/2022 | Du et al. | | |
| 2023/0022884 A1 * | 1/2023 | Faizian | ............... | G06F 11/3433 |
| 2023/0177053 A1 * | 6/2023 | Interlandi | ......... | G06F 16/24545 707/713 |
| 2023/0306026 A1 * | 9/2023 | Shen | ................. | G06F 16/24545 |

* cited by examiner

*Primary Examiner* — Jorge A Casanova
(74) *Attorney, Agent, or Firm* — Lily Neff; Andrew D. Wright; Calderon Safran & Wright P.C.

(57) ABSTRACT

Embodiments analyze a query pattern of an incoming query on a database, perform a semantic analysis of the query pattern of the incoming query, generate a re-write query that has an improved query performance in comparison to a query performance of the incoming query based on the analyzed query pattern and the semantic analysis; build a query model using machine learning based on at least one of the query pattern and the semantic analysis; and apply the re-write query by performing the re-write query on the database to provide the improved query performance.

20 Claims, 6 Drawing Sheets

| | Query Context | Rewrite query | Used frequency | Performance Benchmark | Recommend Ratio |
|---|---|---|---|---|---|
| Query Pattern A | Context A | Re-write A | 55% | 80% | 70% |
| Query Pattern A | Context A | Re-write B | 35% | 7% | 18% |
| Query Pattern A | Context A | Re-write C | 10% | 13% | 12% |
| Query Pattern A | Context B | Re-write A | 35% | 13% | 12% |
| Query Pattern A | Context B | Re-write B | 55% | 80% | 18% |
| Query Pattern A | Context B | Re-write C | 10% | 7% | 70% |
| Query Pattern A | Context C | Re-write A | 35% | 13% | 70% |
| Query Pattern A | Context C | Re-write B | 10% | 7% | 12% |
| Query Pattern A | Context C | Re-write C | 55% | 80% | 18% |
| Query Pattern B | ... | ... | ... | ... | ... |
| Query Pattern C | ... | ... | ... | ... | ... |

QUERY PERFORMANCE DISCOVERY AND IMPROVEMENT

BACKGROUND

Aspects of the present invention relate generally to query performance discovery and improvement and, more particularly, to query performance discovery and improvement through syntactic structure and semantic analysis.

In database applications, database tuning, adjusting of user queries, combining of tables, and joining of predicate and indexes may be performed due to a separation of a business layer and an entity logic layer. In an example, user queries may include association relationships between different combinational fields within a database.

SUMMARY

In a first aspect of the invention, there is a computer-implemented method including: analyzing, by a processor set, a query pattern of an incoming query; performing, by the processor set, a semantic analysis of the query pattern of the incoming query on a database; generating, by the processor set, a re-write query that has an improved query performance in comparison to a query performance of the incoming query based on the analyzed query pattern and the semantic analysis; building, by the processor set, a query model using machine learning based on at least one of the query pattern and the semantic analysis; and applying, by the processor set, the re-write query by performing the re-write query on the database to provide the improved query performance.

In another aspect of the invention, there is a computer program product including one or more computer readable storage media having program instructions collectively stored on the one or more computer readable storage media. The program instructions are executable to: analyze a query pattern of an incoming query on a database; perform a semantic analysis of the query pattern of the incoming query; generate a re-write query that has an improved query performance in comparison to a query performance of the incoming query based on the analyzed query pattern and the semantic analysis; build a query model using machine learning based on at least one of the query pattern and the semantic analysis; and apply the re-write query by performing the re-write query on the database to provide the improved query performance.

In another aspect of the invention, there is a system including a processor set, one or more computer readable storage media, and program instructions collectively stored on the one or more computer readable storage media. The program instructions are executable to: analyze a query pattern of an incoming query on a database; perform a semantic analysis of the query pattern of the incoming query; generate a re-write query that has an improved query performance in comparison to a query performance of the incoming query based on the analyzed query pattern and the semantic analysis; build a query model using machine learning based on at least one of the query pattern and the semantic analysis; and apply the re-write query by performing the re-write query on the database to provide the improved query performance. The incoming query includes an association rule between at least two items.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to query performance discovery and improvement and, more particularly, to query performance discovery and improvement through syntactic structure and semantic analysis. Embodiments of the present invention allow for an automated and reliable way to detect and refine a real-time model to provide process improvements for re-writing a query of a database. Embodiments of the present invention analyze and integrate query and data characteristics and build and train a model by using syntactic structure and semantic analysis to re-write a query. Embodiments of the present invention also discover poor performance of a query via historical query performance analysis. Embodiments of the present invention receive at least one input query and provide a dynamic re-write of the at least one input query. Embodiments of the present invention provide a query plan according to at least one input query and share the query plan among a plurality of databases within a cloud environment. Embodiments of the present invention also provide an artificial intelligence (AI) query tuning system for improving a query performance.

Embodiments of the present invention provide a computer-implemented method, a system, and a computer program product for discovering a poor performance query and utilizing an adaptive and on-demand query re-write based on semantic analysis of a query for improving performance of the query through a hybrid cloud database. In contrast, conventional systems utilize simple queries of association relationships in multiple dimensions, which significantly impacts and adversely affects performance. Embodiments of the present invention provide improve performance and adaptation in a hybrid cloud database environment through a re-write of queries.

Embodiments of the present invention include a highly computationally efficient system, method, and computer program product for providing a query re-write to improve performance of at least one incoming query. Accordingly, implementations of the present invention provide an improvement (i.e., technical solution) to a problem arising in the technical field of providing queries on association relationships in multiple dimensions, which significantly impact query performance. In particular, embodiments of the present invention determine features of a re-write query by collecting a database catalog, statistical analysis, and activity collection on an incoming query. Also, embodiments of the present invention may not be performed in the human mind because aspects of the present invention build and train an artificial intelligence (AI) model to re-write a query in a cost effective way by utilizing analysis and simulation of a syntactic structure and semantic features of the incoming query. Further, these implementations of the present invention refine the AI model based on different database structures within the cloud environment. In addition, implementations of the present invention update parameters of the cloud environment in real-time or near real-time so that the AI model is dynamically updated to provide the re-write query in real-time or near real-time based on the training.

Implementations of the present invention are necessarily rooted in computer technology. For example, the step of building a query model using machine learning based on at least one of a query pattern and semantic analysis is computer-based and cannot be performed in the human mind. Training and building the query model by machine learning is, by definition, performed by a computer and cannot practically be performed in the human mind (or with pen and paper) due to the complexity and massive amounts of calculations involved. For example, building the query model in embodiments of the present invention may use machine learning to build a query pattern knowledge map based on association rules of the incoming query and historical query performance. In particular, building the query model using machine learning in embodiments of the present invention performs a large amount of processing of current and past query data and modeling of parameters to train the query model such that the query model generates an output in real time (or near real time). Given the scale and complexity of processing current and past query data and modeling of parameters, it is simply not possible for the human mind, or for a person using pen and paper, to perform the number of calculations involved in training and/or building the query model.

Aspects of the present invention include a method, system, and computer program product for re-writing a query. For example, a computer-implemented method includes: collecting a database catalog, statistics and activities collection to discover features of an incoming query; training an artificial intelligence (AI) model by simulating a syntactic structure and semantic analysis of the incoming query to re-write a query; refining the AI model across different databases within a cloud environment based on the training of the AI model; and updating a plurality of parameters within the cloud environment in real-time such that the AI model is updated in real-time.

In aspects of the present invention, the training the AI model further includes: determining a query pattern based on a query structure and database statistics; and building a knowledge map based on rules or training a cluster machine learning module to detect the query pattern and relationship between the database statistics and the query pattern. In embodiments, the building the knowledge map utilizes analysis and mining of the query structure and the database statistics for a multi-tenant cluster based on training of the cluster machine learning module. In embodiments, the refining the AI model further includes: determining related or replaceable fields; determining an item of an association rule; mining the item of the association rule with a high confidence; replacing an item used in the query to re-write a query; identifying the item used in the re-written query; and mining a table to check the item. In the table, a prior item may be used to replace original fields if there is a high credibility associated rule with the item. Mining the table to check the item may include analyzing a query history and identifying frequently used items, mining the item of the association rule with the high confidence as a prior or posterior item from a table or a join table, and saving these associations as a knowledge graph. In embodiments, the refining the AI model is used when a new query is received with low performance. The updating the plurality of parameters may further include: building a query pattern knowledge base according to historical query performance analysis and machine learning; and creating a performance knowledge base to build a map between the query pattern or context and a performance indicator.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
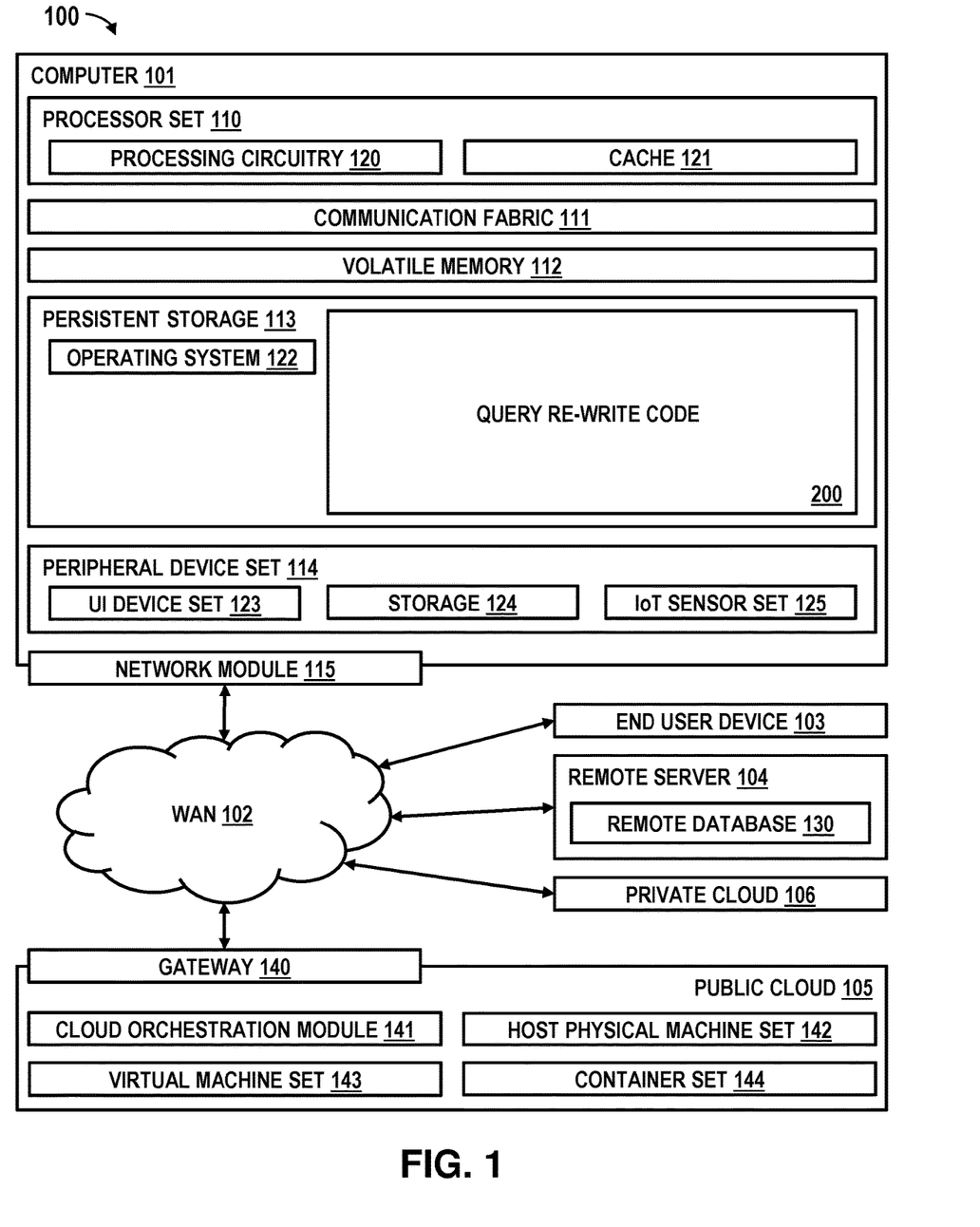
FIG. 1 depicts a computing environment according to an embodiment of the present invention.

Computing environment 100 contains an example of an environment for the execution of at least some of the computer code involved in performing the inventive methods, such as query re-write code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
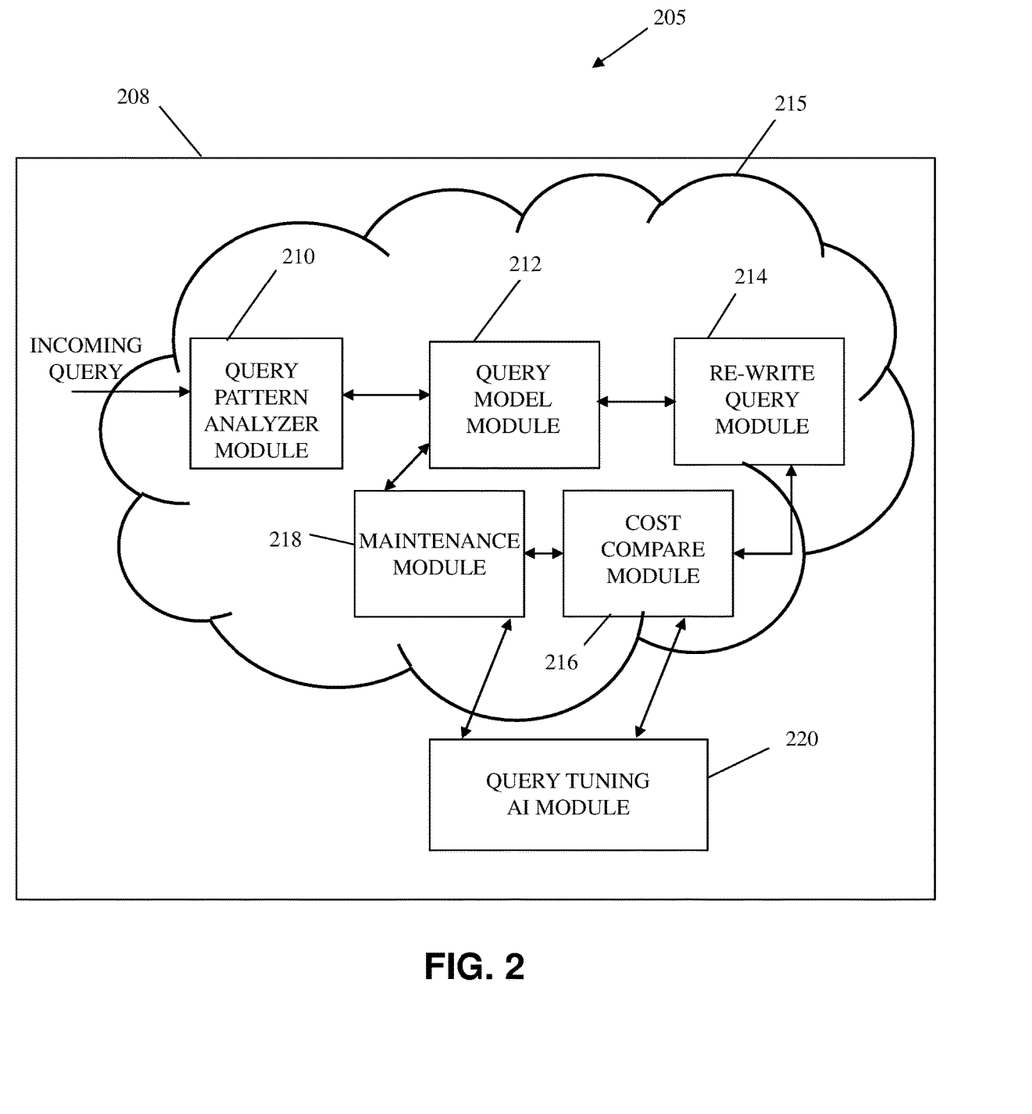
FIG. 2 shows a block diagram of an exemplary environment in accordance with aspects of the present invention.

FIG. 2 shows a block diagram of an exemplary environment 205 in accordance with aspects of the present invention. In embodiments, the environment 205 includes a re-write query server 208, which may comprise one or more instances of the computer 101 of FIG. 1. In other examples, the re-write query server 208 comprises one or more virtual machines or one or more containers running on one or more instances of the computer 101 of FIG. 1.

In embodiments, the re-write query server 208 of FIG. 2 comprises a query pattern analyzer module 210, a query model module 212, a re-write query module 214, a cost compare module 216, a maintenance module 218, and a query tuning artificial intelligence (AI) module 220, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the present invention as described herein. These modules of the code of block 200 are executable by the processing circuitry 120 of FIG. 1 to perform the inventive methods as described herein. The re-write query server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In FIG. 2, and in accordance with aspects of the present invention, the query tuning AI module 220 communicates with a cloud-based system 215 which includes the query pattern analyzer module 210, the query model module 212, the re-write query module 214, the cost compare module 216, and the maintenance module 218. However, embodiments are not limited to this example, and the query tuning AI module 220 may also be included in the cloud-based system 215.

In FIG. 2, and in accordance with aspects of the present invention, the query pattern analyzer module 210 receives an incoming query for a database from a user device. In embodiments, the query pattern analyzer module 210 analyzes and determines a query pattern in a query string of the incoming query and performs semantic analysis of the incoming query. In particular, the query pattern analyzer module 210 analyzes the query pattern of the incoming query and performs the semantic analysis of the query pattern by collecting and analyzing a system catalog, a database catalog, database activities, database statistics, statistical analysis, syntactic structure, and activity collection on the incoming query. The query pattern analyzer module 210 collects the database catalog, database activities, and database statistics to obtain related database object and data usage. In an example, the query pattern analyzer module 210 collects database statistics including a partition key, a histogram, cardinality, frequency, etc. The query pattern analyzer module 210 determines the query pattern based on a query structure of the incoming query and the database statistics related to the incoming query. In embodiments, in response to using a multi-tenant cluster, the query pattern analyzer module 210 analyzes and determines the query pattern in the query string of the incoming query and performs semantic analysis of the incoming query for multiple incoming queries across cluster groups.

In embodiments of FIG. 2, the query pattern analyzer module 210 determines a query performance of the incoming query based on the determined query pattern in the query string of the incoming query. In other embodiments, the query pattern analyzer module 210 determines the query performance of the incoming query based on an analysis of historical query performance of at least one query which is similar to or same as the incoming query. In particular, the query pattern analyzer module 210 determines the query performance based on a query model from the query model module 212. The query model of the query model module 212 is trained using machine learning based on the historical query performance and a query pattern knowledge base. Details of the query model and the query model module 212 are further described herein. After the query pattern analyzer module 210 determines the query pattern in the query string of the incoming query, the query pattern analyzer module 210 normalizes the query pattern by eliminating data redundancy and enhancing data integrity. The query pattern analyzer module 210 sends the query pattern, the semantic analysis, the syntactic structure, and statistics of the incoming query to the query model module 212.

In FIG. 2, and in accordance with aspects of the present invention, the query model module 212 builds the query model using machine learning based on the query pattern, the semantic analysis, the syntactic structure, and statistics of the incoming query from the query pattern analyzer module 210. In embodiments, the query model module 212 builds the query model using machine learning by building the query pattern knowledge map based on association rules and the historical query performance. In other embodiments, the query model module 212 builds the query model using machine learning by training a clustering machine learning system using a clustering method to detect a relationship between the query pattern and statistics of the incoming query. In further embodiments, the query model module 212 builds the query model using machine learning by building a performance knowledge base which maps the query pattern and query context of historical queries to a performance indicator. The query model module 212 determines a re-write query which has improved query performance in comparison to the incoming query based on at least one of the query pattern, the query pattern knowledge map, the relationship between the query pattern and the statistics of the incoming query, and the performance knowledge base and sends the re-write query to the re-write query module 214. In embodiments, the query model module 212 determines the re-write query in an automated process without user input. In other embodiments, the query model module 212 determines the re-write query with user input to determine the re-write query. After the query model of the query model module 212 sends the re-write query to the re-write query module 214. the query model module 212 sends a message to the maintenance module 218 that the re-write query has been sent to the re-write query module 214.

In FIG. 2, and in accordance with aspects of the present invention, the re-write query module 214 receives the re-write query from the query model module 212. The re-write query module 214 applies the re-write query from the query model module 212 by performing the re-write query on the database. By applying the re-write query from the query model module 212, the re-write query module 214 improves query performance of the re-write query server 208 in comparison to performance of the incoming query. In addition, the re-write query module 214 sends the re-write query to other databases in the re-write query server 208.

In FIG. 2, and in accordance with aspects of the present invention, the maintenance module 218 receives the message that the re-write query has been sent to the re-write query module 214. In response to receiving the message, the maintenance module 218 sends an instruction to the query model module 212 to maintain the query model in an idle state.

In FIG. 2, and in accordance with aspects of the present invention, the query tuning AI module 220, which is external to the cloud-based system 215, includes a knowledge center and an external model for refining a query tuning process. In particular, the external model is trained using a knowledge corpus included in the knowledge center. Therefore, the query tuning AI module 220 provides further query improvement by sending another re-write query to the cost compare module 216 based on the trained external model.

In FIG. 2, and in accordance with aspects of the present invention, the cost compare module 216 compares another re-write query from the query tuning AI module 220 with the re-write query received at the re-write query module 214. In particular, the cost compare module 216 determines whether a query performance improvement of the another re-write query from the query tuning AI module 220 is better than a query performance improvement of the re-write query received at the re-write query module 214 by analyzing a query performance of the another re-write query and comparing the query performance of the another re-write query to the query performance of the re-write query. In response to the query performance improvement of the another re-write query from the query tuning AI module 220 being better than the query performance improvement of the re-write query received at the re-write query module 214, the cost compare module 216 sends the another re-write query to the re-write query module 214 so that the re-write query module 214 applies the another re-write query (i.e., the another re-write query replaces the re-write query) to provide even greater query performance improvement in comparison to the query performance of the re-write query. In response to the query performance improvement of the another re-write query from the query tuning AI module 220 being worse than the query performance improvement of the re-write query received at the re-write query module 214, the cost compare module 216 does not send the another re-write query to the re-write query module 214 and sends a message to the maintenance module 218 to maintain the query model in an idle state. In this scenario, the maintenance module 218 will receive this message and pass it on to the re-write query module 214 to maintain the query model in the idle state.

As an example of FIG. 2, the incoming query may be an association rule, such as educ=15.0 and jobtime=97.0. In other words, the incoming query may require educ=15.0 and jobtime=97.0 to be true to return results of a table or database. In this example, educ represents an education level, while jobtime represents a time of a job. The query pattern analyzer module 210 analyzes this incoming query for a query pattern, such as an association rule, and performs semantic analysis and sends the results to the query model module 212. The query model module 212 looks at both current records (from a table or a database) and historical records to determine if there is a high confidence association rule. For example, in response to both the current records and the historical records having a ratio of all records with educ=15.0 and jobtime=97.0 exceeding an 85% threshold value, then the query model module 212 determines that there is a high confidence association rule between educ=15.0 and jobtime=97.0. In other words, there is a high confidence that jobtime=97.0 can be replaced by educ=15.0 when re-writing the incoming query because there is a high confidence of association between jobtime=97.0 and educ=15.0.

In this example of FIG. 2, the query model module 212 replaces the item jobtime=97.0 with item educ=15.0 to create the re-write query because of the high confidence association rule. The query model module 212 creates a re-write query by replacing the item (i.e., jobtime=97.0) used in the incoming query for any association rule (i.e., jobtime=97.0 and educ=15.0) which has a high confidence (i.e., exceeds an 85% threshold value). Since the query model module 212 simplifies the incoming query from educ=15.0 and jobtime=97.0 to a re-write query of finding educ=15.0, query performance in the re-write query server 208 is improved. Also, the query model module 212 saves these high confidence association rules (e.g., educ=15.0 and jobtime=97.0) in the query pattern knowledge map and the performance knowledge base. In this scenario, when another incoming query is received with an association rule that matches one of the previous high confidence association rules in the query pattern knowledge and the performance knowledge base, the query model module 212 immediately re-writes the another incoming query based on the previous high confidence association rules, which further improves performance of the query by improving a time to re-write the another incoming query. In other embodiments of FIG. 2, the query model module 212 and the query model module 212 uses a sequence analysis algorithm to generate a re-write query.

Figure 3:
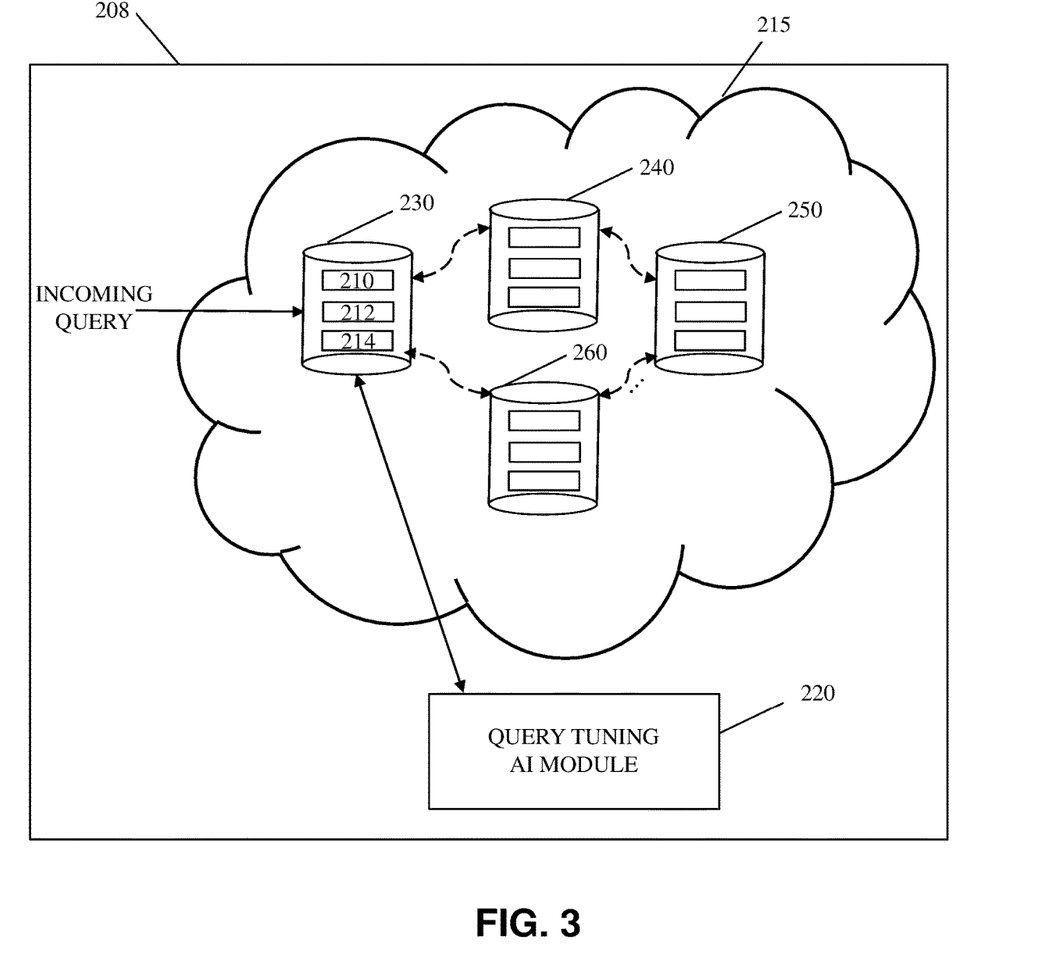
FIG. 3 shows a block diagram of another exemplary environment in accordance with aspects of the present invention.

FIG. 3 shows a block diagram of another exemplary environment in accordance with aspects of the present invention. In FIG. 3, the cloud-based system 215 is a cross hybrid database which includes a first database 230, a second database 240, a third database 250, . . . and a nth database 260 (n being an integer which represents the number of databases). In FIG. 3, the incoming query is sent to a database 230 which includes the query pattern analyzer module 210 the query model module 212, and the re-write query module 214 (as described in FIG. 2). The query tuning AI module 220 (as described in FIG. 2) also communicates with the first database 230.

In FIG. 3, and in accordance with aspects of the present invention, the re-write query module 214 of the first database 230 applies a re-write query instead of the incoming query to improve query performance. Also, in FIG. 3, the first database 230 shares the re-write query with the second database 240 so that the second database 240 also gains the benefit of the improved query performance. The second database 240 shares the re-write query with the third database 250 for similar reasons. The third database 250 shares the re-write query with the next database, and so on until the nth database 260 receives the re-write query. Thus, all of the databases (e.g., databases 230, 240, 250, . . . 260) in the cloud-based system 215 will have improved query performance based on the re-write query being created in the first database 230 and improve an overall query performance of the re-write query server 208. In addition, the query tuning AI module 220 may provide further query improvements as described herein with respect to FIG. 2.

Figure 4:
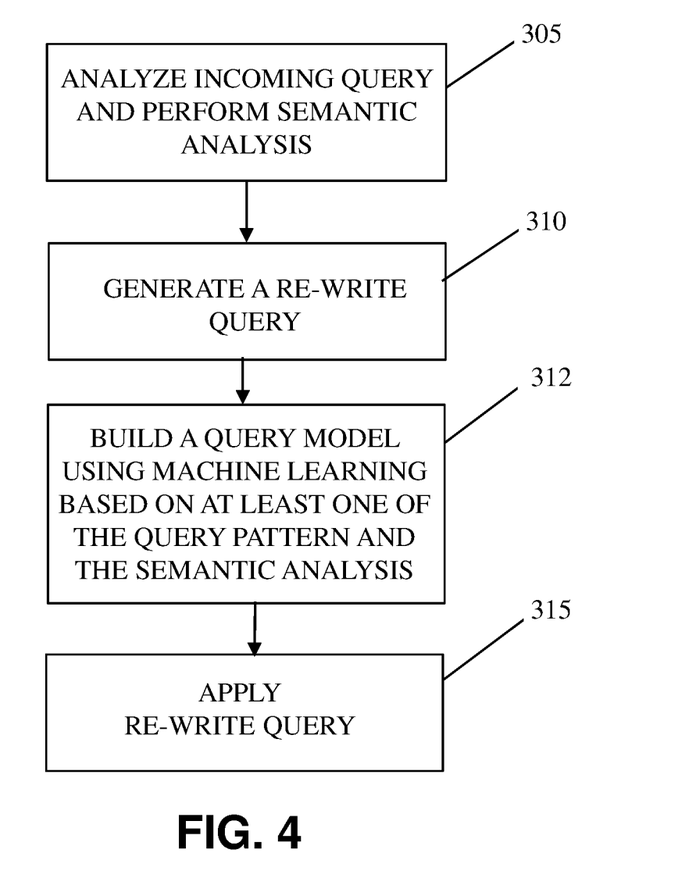
FIG. 4 shows a flowchart of an exemplary method in accordance with aspects of the present invention.

FIG. 4 shows a flowchart of an exemplary method in accordance with aspects of the present invention. Steps of the method may be carried out in the environment of FIG. 2 and are described with reference to elements depicted in FIG. 2.

In embodiments of FIG. 4, at step 305, the system analyzes, at query pattern analyzer module 210, an incoming query of a database. In embodiments and as described with FIG. 2, the query pattern analyzer module 210 analyzes the query pattern of the incoming query and performs the semantic analysis of the query pattern by collecting and analyzing a system catalog, a database catalog, database activities, database statistics, statistical analysis, syntactic structure, and activity collection of the incoming query. The query pattern analyzer module 210 sends the query pattern, the semantic analysis, the syntactic structure, and statistics of the incoming query to the query model module 212.

At step 310, the system determines, at the query model module 212, a re-write query based on the query pattern, the semantic analysis, the syntactic structure, and statistics of the incoming query. In embodiments and as described with FIG. 2, the query model module 212 determines the re-write query which has improved query performance in comparison to the incoming query based on at least one of the query pattern, the query pattern knowledge map built using machine learning, the relationship between the query pattern and the statistics of the incoming query, and the performance knowledge base built using machine learning. The query model module 212 sends the re-write query to the re-write query module 214.

At step 312, the system builds, at the re-write query module 212, a query model using machine learning based on at least one of the query pattern and the semantic analysis. In embodiments and as described with FIG. 2, the re-write query module 212 builds the query model using machine learning based on both the query pattern and the semantic analysis.

At step 315, the system applies, at the re-write query module 214, the re-write query by performing the re-write query on the database to provide improved query performance of the re-write query server 208 in comparison to query performance of the incoming query. In embodiments and as described with FIG. 2, the re-write query module 214 sends the re-write query to other databases in the re-write query server 208.

Figure 5:
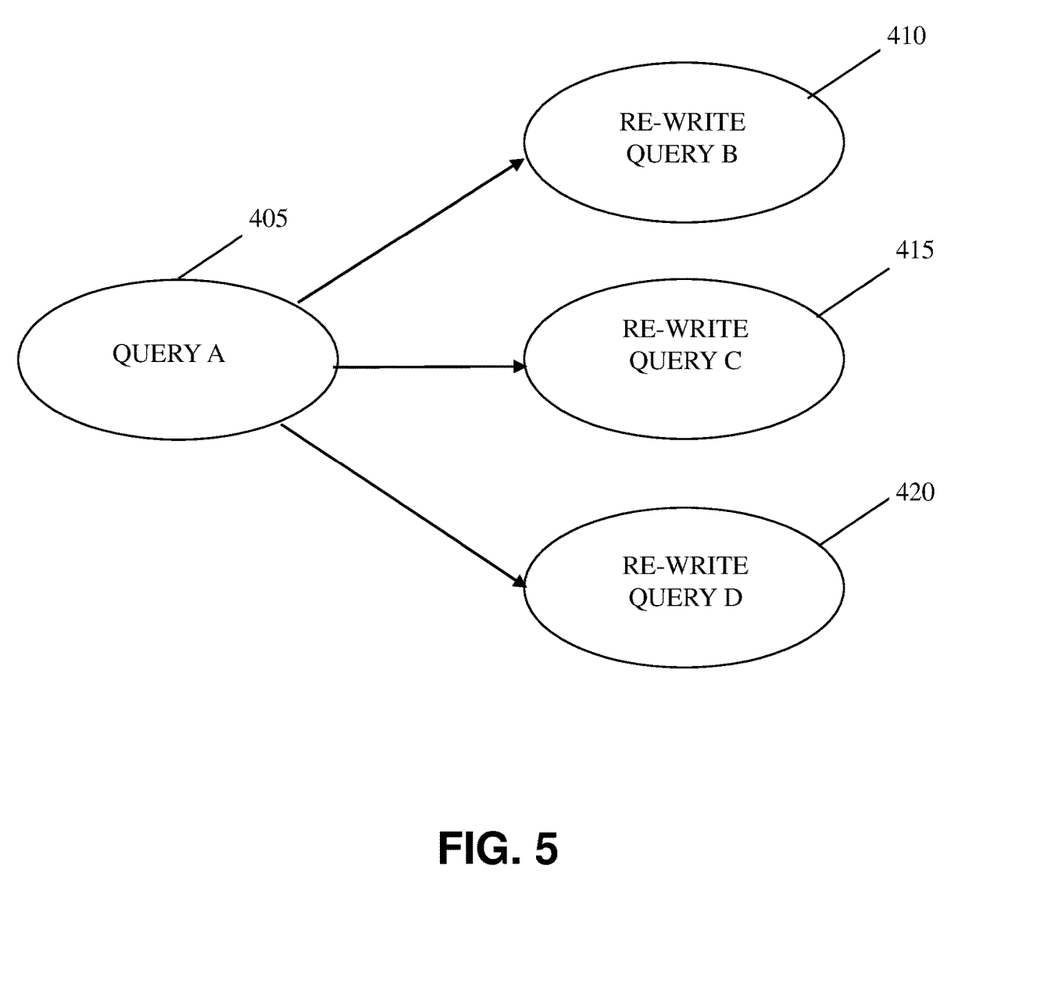
FIG. 5 shows a flowchart of an exemplary method in accordance with aspects of the present invention.

FIG. 5 shows a flowchart of an exemplary method in accordance with aspects of the present invention. Steps of the method may be carried out in the environment of FIG. 2 and are described with reference to elements depicted in FIG. 2.

In embodiments of FIG. 5, at step 405, the system analyzes, at the query pattern analyzer module 210, query A. In embodiments and as described with FIG. 2, the query pattern analyzer module 210 analyzes a query pattern of query A and performs the semantic analysis of the query pattern by collecting and analyzing a system catalog, a database catalog, database activities, database statistics, statistical analysis, syntactic structure, and activity collection of query A. The query pattern analyzer module 210 sends the query pattern, the semantic analysis, the syntactic structure, and statistics of query A to the query model module 212.

In embodiments of FIG. 5, at step 410, the system determines, at the query model module 212, a re-write query B based on the query pattern, the semantic analysis, the syntactic structure, and statistics of query A. At step 415, the system determines, at the query model module 212, a re-write query C based on the query pattern, the semantic analysis, the syntactic structure, and statistics of query A. At step 420, the system determines, at the query model module 212, a re-write query D based on the query pattern, the semantic analysis, the syntactic structure, and statistics of query A. In particular, the query model module 212 determines the re-write query B, the re-write query C, and the re-write query D as different potential re-write queries which provide accurate query results and improve the query performance of the incoming query of the database. As an example, the query module 212 may determine each of the re-write query B, the re-write query C, and the re-write query D by using different high confidence association rules corresponding with the association rule for items in the incoming query. The query model module 212 also communicates with the query pattern analyzer module 210 to determine an improved query performance of re-write query B, re-write query C, and re-write query D. The query model module 212 then determines which of the re-write query B, re-write query C, and re-write query D has the best performance and sends the best performance re-write query to the re-write query module 214 for applying the best performance re-write query to improve query performance in the re-write query server 208.

Figure 6:
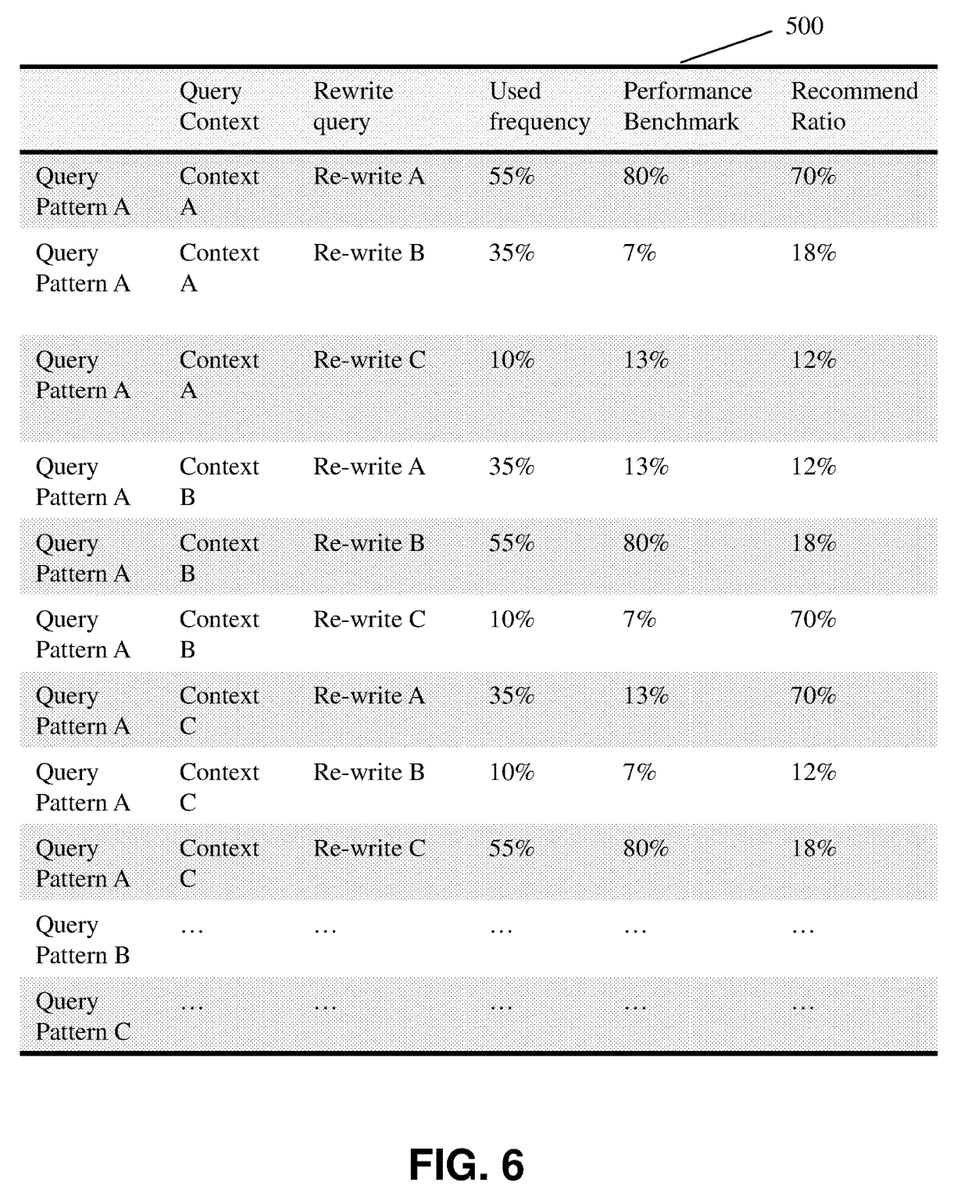
FIG. 6 shows a table in accordance with aspects of the present invention.

FIG. 6 shows a table in accordance with aspects of the present invention. FIG. 6 shows the table 500 which is an example of the performance knowledge base built by the query model module 212. The performance knowledge base in the table 500 shows a map between a query pattern, a query context, and performance indicators. In the table 500, the query context refers to a query structure and a query size, the used frequency represents how much of a query has been re-written, the performance benchmark is an estimate of query performance improvement of the re-written code, and the recommended ratio is the estimate of query performance improvement based on the combination of the used frequency and the performance benchmark.

In embodiments, a service provider could offer to perform the processes described herein. In this case, the service provider can create, maintain, deploy, support, etc., the computer infrastructure that performs the process steps of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the present invention provides a computer-implemented method, via a network. In this case, a computer infrastructure, such as computer 101 of FIG. 1, can be provided and one or more systems for performing the processes of the present invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
analyzing, by a processor set, a query pattern of an incoming query on a database;
performing, by the processor set, a semantic analysis of the query pattern of the incoming query;
generating, by the processor set, a re-write query that has an improved query performance in comparison to a query performance of the incoming query based on the analyzed query pattern and the semantic analysis;
building, by the processor set, a query model using machine learning based on at least one of the query pattern and the semantic analysis;
applying, by the processor set, the re-write query by performing the re-write query on the database to provide the improved query performance; and
receiving, by the processor set, another re-write query based on a trained external model.

2. The computer-implemented method of claim 1, wherein the analyzing the query pattern and performing the semantic analysis further comprises collecting and analyzing a system catalog, a database catalog, database activities, database statistics, statistical analysis, syntactic structure, and activity collection on the incoming query.

3. The computer-implemented method of claim 2, wherein the database statistics include a partition key, a histogram, a cardinality, and a frequency.

4. The computer-implemented method of claim 1, wherein the building the query model using machine learning is based on both the query pattern and the semantic analysis.

5. The computer-implemented method of claim 4, wherein the building the query model using machine learning comprises building a query pattern knowledge map based on association rules of the incoming query and historical query performance.

6. The computer-implemented method of claim 4, wherein the building the query model using machine learning comprises detecting a relationship between the query pattern and statistics of the incoming query.

7. The computer-implemented method of claim 4, wherein the building the query model using machine learning comprises building a performance knowledge base that maps the query pattern and query context of historical queries to a performance indicator.

8. The computer-implemented method of claim 1, further comprising sending the re-write query to other databases within a cloud environment to improve query performance of the other databases.

9. The computer-implemented method of claim 1, further comprising replacing the re-write query with the another re-write query in response to a query performance of the another re-write query being greater than a query performance of the re-write query.

10. The computer-implemented method of claim 1, wherein the trained external model has been trained using a knowledge corpus in a knowledge center, the knowledge center is external to a cloud environment, and the incoming query comprises an association rule between at least two items.

11. The computer-implemented method of claim 1, wherein the query model is built by using machine learning to build a performance knowledge base which maps the query pattern and query context of historical queries to a performance indicator.

12. A computer program product comprising one or more computer readable storage media having program instructions collectively stored on the one or more computer readable storage media, the program instructions executable to:
   analyze a query pattern of an incoming query on a database;
   perform a semantic analysis of the query pattern of the incoming query;
   generate a re-write query that has an improved query performance in comparison to a query performance of the incoming query based on the analyzed query pattern and the semantic analysis;
   build a query model using machine learning based on at least one of the query pattern and the semantic analysis;
   apply the re-write query by performing the re-write query on the database to provide the improved query performance; and
   receive another re-write query based on a trained external model.

13. The computer program product of claim 12, wherein the trained external model has been trained using a knowledge corpus in a knowledge center, the knowledge center is external to a cloud environment, and the analyzing the query pattern and performing the semantic analysis further comprises collecting and analyzing a system catalog, a database catalog, database activities, database statistics, statistical analysis, syntactic structure, and activity collection on the incoming query.

14. The computer program product of claim 13, wherein the database statistics include a partition key, a histogram, a cardinality, and a frequency.

15. The computer program product of claim 12, wherein the building the query model using machine learning based on both the query pattern and the semantic analysis.

16. The computer program product of claim 15, wherein the building the query model using machine learning comprises building a query pattern knowledge map based on association rules of the incoming query and historical query performance.

17. The computer program product of claim 15, wherein the building the query model using machine learning comprises detecting a relationship between the query pattern and statistics of the incoming query.

18. The computer program product of claim 15, wherein the building the query model using machine learning comprises building a performance knowledge base that maps the query pattern and query context of historical queries to a performance indicator.

19. The computer program product of claim 12, wherein the query model is built by using machine learning to train a clustering machine learning system with a clustering method to detect a relationship between the query pattern and statistics of the incoming query, and the incoming query comprises an association rule between at least two items.

20. A system comprising:
   a processor set, one or more computer readable storage media, and program instructions collectively stored on the one or more computer readable storage media, the program instructions executable to:
   analyze a query pattern of an incoming query on a database;
   perform a semantic analysis of the query pattern of the incoming query;
   generate a re-write query that has an improved query performance in comparison to a query performance of the incoming query based on the analyzed query pattern and the semantic analysis;
   build a query model using machine learning based on at least one of the query pattern and the semantic analysis;
   apply the re-write query by performing the re-write query on the database to provide the improved query performance; and
   receive another re-write query based on a trained external model,
   wherein the incoming query comprises an association rule between at least two items.

* * * * *